United States Patent Office 3,316,212
Patented Apr. 25, 1967

3,316,212
AROMATIC POLYAMIDE-AMIDES
Rudolph J. Angelo, Wilmington, Del., and William Earl Tatum, Tonawanda, N.Y., assignors to E. I. du Pont de Nemours and Company, Wilmington, Del., a corporation of Delaware
No Drawing. Filed Nov. 21, 1963, Ser. No. 325,442
11 Claims. (Cl. 260—47)

This invention relates to the preparation of polymeric articles and coatings. More particularly, it relates to the preparation of polymers that are useful in special applications and, in some cases, can be used as an intermediate to be converted to a polymer having more desirable properties.

The importance of relatively stable intermediates that can be easily converted to a final product having very desirable properties can be appreciated by by one skilled in the art. For example, the aromatic polyimides are known for their chemical and thermal stability. Since they do not melt easily nor dissolve easily, the difficulty of shaping this polymer into useful articles is a serious obstacle to commercial development. Recently, processes utilizing the shaping of polyamide-acid intermediates followed by conversion to the polyimide have been proposed. However, the polyamide-acids, in some cases, tend to convert to polyimides during storage or, in some cases, are of high stability, converting only upon exposure to temperatures which are extremely high for organic materials.

It is an object of this invention to provide a useful polymer, and one that, as an intermediate, may be sufficiently stable to be stored for long periods, yet sufficiently "unstable" to convert relatively easily (at relatively low temperatures) to polyimide when desired. Other objects will appear hereinafter.

The objects are accomplished by the use of an intermediate linear polymer, an aromatic polyamide-amide having the formula:

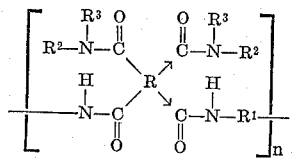

wherein the arrows denote isomerism;[1]

R is an aromatic tetravalent organic radical;
$R^1$ is arylene;
$R^2$ is hydrogen, alkyl or aryl;
$R^3$ is hydrogen, alkyl, aryl or amino-alkyl; and
$n$ is an integer sufficiently high to provide a film-forming polymer, i.e., having an inherent viscosity at 30° C. of at least .05, preferably 0.3–5.0, as measured as a 0.5% solution in a suitable solvent (concentrated sulfuric acid, N,N-dimethylacetamide, etc.).

One process for forming the polyamide-amide involves the formation of a polyisoimide or, more accurately, a poly-(5-imino-γ-lactone)[2] having the following formula:

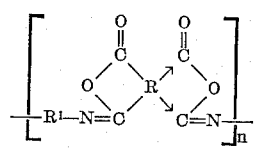

[1] In any recurring unit the groups to which arrows point may exist as shown or in interchanged position.
[2] Anhydrides of acids in which the C=O groups are ortho give 5-imino-γ-lactones. Anhydrides of acids in which the C=O groups are peri give 6-imino-δ-lactones.

and, thereafter, reacting the polylactone with a compound having the formula

to form the polyamide-amide. The polyiminolactone may be prepared by any of several methods. One method, as disclosed in copending U.S. application Ser. No. 325,479, filed Nov. 21, 1963 by Rudolph J. Angelo and assigned to the assignee of the present application involves reacting an aromatic dianhydride and an aromatic diamine under conditions to form a polyamide-acid followed by treatment with N,N'-disubstituted carbodiimides of the formula $R^7—N=C=N—R^7$ wherein $R^7$ is alkyl or aryl, preferably n-butyl, phenyl, meta-tolyl, paratolyl, meta-chlorophenyl, para-chlorophenyl, meta-nitrophenyl, cyclohexyl, paramethoxyphenyl or alpha-naphthyl.

Another method for preparing the polyiminolactones is disclosed in copending U.S. application Ser. No. 325,441, filed Nov. 21, 1963 by John A. Kreuz and assigned to the assignee of the present application. This method involves treating a polyamide-acid with a compound from the group consisting of lower fatty acid halides, halogenated lower fatty acid halides, halogenated lower fatty acid anhydrides, aryl phosphonic dihalides and thionyl halides to form the polyiminolactone.

The first step, the preparation of the polyamide-acid composition, involves reacting at least one aromatic diamine having the structural formula $H_2N—R^1—NH_2$ with at least one tetracarboxylic acid dianhydride having the structural formula

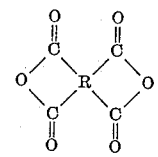

wherein R is a tetravalent aromatic radical and $R^1$ is arylene, in an organic solvent for at least one of the reactants, the solvent being inert to the reactants, preferably under anhydrous conditions, for a time and at a temperature sufficient to provide the polyamide-acid:

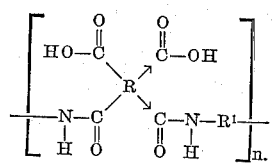

It should be understood that it is not necessary that the polymeric component of the composition be composed entirely of the polyamide-acid. This is particularly true since conversion to other intermediates and, eventually, conversion to the polyimide may be contemplated. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inheernt viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.05, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

By use of the term "solution," whether it is a solution of the polyamide-acid, the polyiminolactone or the polyamide-amide, it is meant to define a solid dissolved in a liquid and vice versa. These latter, liquids dissolved in solids, are commonly called gels. The gels may exist as homogeneous masses of liquid and solid in any form.

The starting materials for forming the polyamide-acids are aromatic diamines and aromatic tetracarboxylic acid dianhydrides. The organic diamines are characterized by the formula:

$$H_2N-R^1-NH_2$$

wherein $R^1$ is a divalent aromatic radical (arylene), preferably selected from the following groups: phenylene, naphthylene, biphenylene, anthrylene, furylene, benzfurylene and

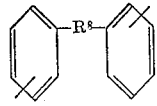

wherein $R^8$ is selected from the group consisting of an alkylene chain having 1–3 carbon atoms,

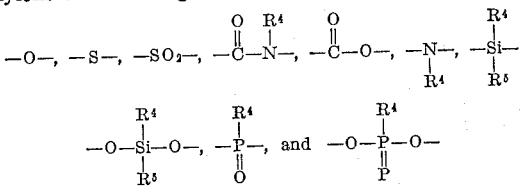

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl) diethyl silane; bis-(4-amino-phenyl) diphenyl silane; benzidine; 3,3'-dichloro-benzidine; 3,3'-dimethoxy benzidine; bis-(4-amino-phenyl) ethyl phosphine oxide; bis-(4-amino-phenyl) phenyl phosphine oxide; bis-(4-amino-phenyl)-N-butylamine; bis-(4-amino-phenyl)-N-methylamine; 1,5-diamino-naphthalene; 3,3'-dimethyl-4,4'-diaminobiphenyl; N-(3-aminophenyl)-4-aminobenzamide; 4-aminophenyl-3-aminobenzoate; and mixtures thereof.

The aromatic tetracarboxylic acid dianhydrides are characterized by the following formula:

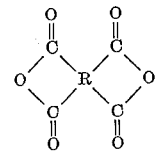

wherein R is a tetravalent aromatic radical, e.g.

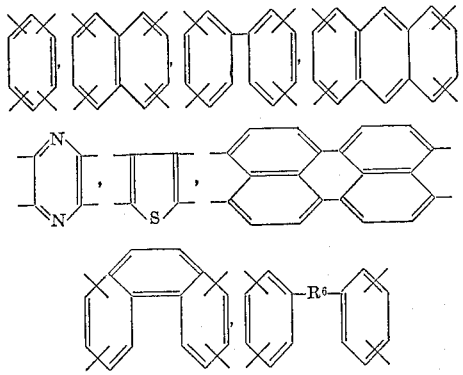

wherein $R^6$ is selected from the group consisting of $R^8$ and

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

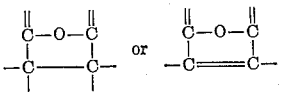

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; 3,4,9,10-perylene tetracarboxylic dianhydride; bis(3,4-dicarboxyphenyl) ether dianhydride; naphthalene-1,2,4,5-tetracarboxylic dianhydride; naphthalene-1,4,5,8-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-1,8,9,10-tetracarboxylic dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(3,4-dicarboxyphenyl) sulfone dianhydride; benzene-1,2,3,4-tetracarboxylic dianhydride; 3,4,3',4'-benzophenone tetracarboxylic dianhydride; 2,3,2',3'-benzophenone tetracarboxylic dianhydride; 2,3,3',4'-benzophenone tetracarboxylic dianhydride; pyrazine-2,3,5,6-tetracarboxylic dianhydride; thiophene-2,3,4,5-tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

In the next step, the polyamide-acid is usually shaped into a useful article, which is then converted to a polylactone having the formula:

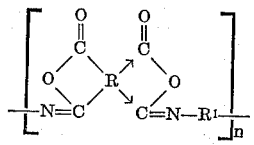

One method involves adding an N,N'-disubstituted carbodiimide in a solvent, e.g., N,N-dicyclohexyl carbodiimide in N,N-dimethylacetamide. The solvent is usually the same solvent that had been used in forming the polyamide-acid. It is necessary to add at least the stoichiometric amount of the carbodiimide (at least 1 mole per amide-acid linkage). Water is removed and adds to the carbodiimide converting the latter to a substituted urea:

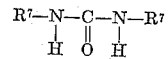

The urea usually precipitates and is removed by centrifuging or filtering, leaving a solution of the polylactone. If the urea does not precipitate, it can be removed by washing.

Another method for converting to the polylactone involves the addition of one of the following cyclizing agents to the polyamide-acid solution: lower fatty acid halide, halogenated lower fatty acid halide, halogenated lower fatty acid anhydride, aryl phosphonic dihalide and thionyl halide. Representative cyclizing agents in this group include: acetyl chloride, bromide, iodide and fluoride; propionyl chloride, bromide, iodide and fluoride; isobutyryl chloride, bromide; n-butyryl chloride, bromide; valeryl chloride; mono-, di- and tri-chloroacetyl chloride; bromoacetyl bromide; chloroacetic anhydride; trifluoroacetic anhydride; phenyl phosphonic dichloride, thionyl chloride, bromide, fluoride and chlorofluoride. Some of the cyclizing agents operate successfully alone; e.g., trifluoroacetic anhydride. The others benefit by the co-action of a tertiary amine; and the cyclizing agent is usually added at room temperature (20–30° C.) along with the tertiary amine. The tertiary amine may be selected from the following: trimethyamine, triethylamine, tri-n-butylamine, N,N-dimethylethanolamine, N,N-dimethyldodecylamine, triethylenediamine, pryridine, the picolines, 2,6-lutidine, 2,4,6-collidine, quinoline, isoquinoline, pyrazine and 2-methylpyrazine. Three particularly useful treatments for forming polylactones are: treatment of the polyamide-acid composition with chloroacetic anhydride and 2-methylpyrazine; with phenyl phosphonic dichloride and pyridine; and with trifluoroacetic anhydride alone.

In the next step, the polyiminolactone composition or shaped article, e.g. film, filament, that may have been formed from the polyamide-acid composition, is treated with ammonia, amine, or diamine, the compound having the formula

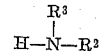

at a temperature of 15°–100° C. in the liquid or vapor state to form the corresponding polyamide-amide. The operable amine compounds include ammonia, methyl amine, dimethyl amine, ethyl amine, diethyl amine, propyl amine, ethylenediamine, analine, N-methylaniline, o-toluidine, m-toluidine, p-chloroaniline, the six xylidines, etc. The preferred amines are ammonia and dimethyl amine. This reaction is usually performed at room temperture.

Another process for preparing the polyamide-amide compositions, particularly the polyamide-amide having recurring units of the formula:

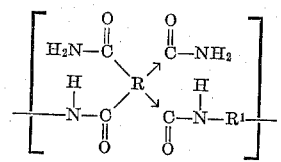

wherein the arrows denote isomerism;
R is an aromatic tetravalent organic radical; and R¹ is arylene, involves reacting at least one diimide of an aromatic tetracarboxylic acid dianhydride and at least one aromatic diamine in an organic solvent for at least one of the reactants, preferably the diimide, the solvent being inert to the reactants, for a time (usually several hours) and at a temperature (usually 75–150° C.) sufficient to provide the polyamide-amide. The diimide may be prepared by passing gaseous ammonia over any of the aromatic tetracarboxylic acid dianhydrides disclosed previously (on pages 8–10) at an elevated temperature. The aromatic diamines are any of those falling within the definition provided on pages 7 and 8. The solvents are any of those disclosed on pages 11 and 12. However, dimethyl sulfoxide is preferred since it is an excellent solvent for the diimide.

The polyamide-amide articles may be used as such or they may be converted by heat to the corresponding polyimide. Some representative uses of shaped articles of the polyamide-amide compositions follow. Since polyamide-amides will convert to polyimide directly at specific temperatures, the amount of conversion measured by infrared techniques may be used to determine temperature. Polyamide-amides also have greater environmental stability than polylactones and may be stored longer. They are also much lighter in color, and their film tensile strengths are more durable on aging.

It is preferred to convert the polyamide-amide, e.g., filament, film, tube, rod, powder, flake, etc., to another polymer to modify the properties of the shaped structure. Thus, the polyamide-amide may be converted by heat treatment to the corresponding polyimide, specifically by heating to a temperature of at least 125° C., preferably at least 150° C., to drive off the amine compound released during conversion and other solvent, if any. At 300° C. the conversion occurs in about 10 minutes. The polyimide has the following structural formula:

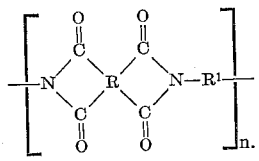

wherein R is a an aromatic tetravalent radical;

R¹ is arylene; and $n$ is an integer sufficiently high to provide an inherent viscosity of at least 0.05 preferably 0.3–5.0, as measured as a 0.5% solution in a suitable solvent.

Most polyamide-amides are difficult to redissolve. Hence, one should either (1) as previously discussed, make them from polyiminolactones which are already in the shape desired for the final polyimide, or (2) shape solutions of polyamide-amides, e.g., the polyamide-amide of 2,4-diamino isopropylbenzene and an aromatic tetracarboxylic acid dianhydride which have been made from solutions of polyiminolactones.

The final shaped article may consist of the polyamide-amide or the polyimide alone or either in a blend with other polymers and/or modified with inert materials. Depending on their nature, inert materials may be added before or after shaping. For example, fillers such as pigments, electrically conductive carbon black and metal particles, abrasives, dielectrics and lubricating polymers may be added.

Instead of being shaped itself or converted to another polymer, the polyamide-amide compositions obtainable as solutions can be used as a coating composition or as an adhesive layer, being converted in situ to the corresponding polyimide. The liquid composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheet, fibers, foams, fabrics, etc.; polymeric materials such as cellulosic materials (cellophane, wood, paper, etc.); polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. The same substrate materials may be used as top layers over the previously-coated substrates to provide laminates wherein the polymeric composition serves as an adhesive layer. Of course, the adhesive layer can be a preformed film of the polyamide-amide composition.

The polyamide-amides, when isolated, are found to be colorless or light colored. They have strong infra-red bands at 2.9–3.1 microns due to N—H bonds of the amide and 6.0–6.25 microns due to C=O bonds of the amide but no absorption at 5.55–6.0 microns due to imide nor at 10.9 microns due to iminolactone. Calculation of their carbon, hydrogen and nitrogen contents are used to check with those calculated for the polyamide-amide structure.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques[3] known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

EXAMPLE 1

Equimolar amounts of pyromellitic dianhydride and 4,4'-diaminodiphenyl ether in about 9 parts by weight N,N-dimethylacetamide are agitated at 25–40° C. until polyamide-acid having an inherent viscosity of 2.98 (as a 0.5% solution in N,N-dimethylacetamide at 30° C.) is obtained. A thin layer of a 9.18% by weight solution in N,N-dimethylacetamide of the polyamide-acid is cast onto a small glass plate with a miniature doctor knife and is then immersed in a bath containing 5.0 grams of N,N'-dicyclohexyl carbodiimide in 30 ml. of dimethylformamide and 70 ml. of N,N-dimethylacetamide. Instantaneously, the outline of the wet film on the glass plate appears due to the immediate color change, first to yellow and then to orange. The film is allowed to remain in contact with the carbodiimide solution for 8 minutes. The film is peeled from the glass plate while still in the bath and transferred to a methylene chloride bath. After washing for several minutes in methylene chloride, the film is transferred to a new bath of methylene chloride and finally to one of heptane. Drying is accomplished at 50° C. in a forced-draft oven.

The infra-red spectrum of the product is consistent with that expected for the iminolactone structure:

5.55 and 10.9 microns—very strong (iminolactone)
13.85 microns—very weak (normal imide).

---

[3] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

A thin piece of the polyiminolactone is suspended in aniline in a closed container. After two hours at room temperature, the color of the film changes from orange to yellow. The film is removed from the aniline, washed in benzene for 8 hours, and then dried at room temperature in vacuum under nitrogen for 2 days. The Infra-red absorption characteristic of the lactone structure disappears and instead absorption peaks at 2.9–3.1 microns and 6.0–6.25 microns indicate that the polyamide-amide has been obtained. Its inherent viscosity is greater than 1. Heating at about 250° C. causes this polyamide-amide to convert to the polyimide.

EXAMPLE 2

Several small thin pieces of the polylactone described in Example 1 are placed in a flask containing benzene. Ammonia is bubbled through the solution at room temperature, and almost instaneously the films become lighter in color. After 15 minutes of ammonia treatment, the thin films are essentially colorless. They are removed and placed in a vacuum oven under nitrogen at room temperature for drying; 3 hours are required. The infra-red spectrum of the products indicates the absence of the polyiminolactone structure and the presence of polyamide-amide.

Three thicker pieces of the same polylactone (1.0 mil) are treated with ammonia gas for 10 minutes as described above. The resulting films, pale yellow in color, are dried as above and examined by infra-red. They are found to be the desired polyamide-amide, and they are quite flexible and strong.

EXAMPLE 3

Following the procedure of Example 2, the polyamide-amide of dimethylamine is prepared by bubbling dimethylamine gas through a bath in which a polylactone sample is immersed. A colorless film is obtained. This is characterized as the desired polyamide-dimethylamide and is found to be a strong, tough film. Its physical properties are as follows:

| | |
|---|---|
| Modulus (k.p.s.i.) 23° C. | 450 |
| Modulus elongation (%) 23° C. | 4.7 |
| 200° C. | 4.8 |
| Tensile strength (k.p.s.i.) 23° C. | 11.6 |
| Tear strength (g./mil) | 3.8 |
| Density (g./cm.²) | 1.247 |
| Pinhole flex life (23° C.) | 1018 |
| Zero strength temperature (° C.) | 643±50 |
| Dielectric constant 23° C. | 6.2 |
| 100° C. | 5.2 |
| Volume resistivity (ohm-cm.) 23° C. | $1.2 \times 10^{11}$ |

When the polyamide-amide is heated at 200° C. for a few hours, conversion to the corresponding polyimide with evolution of dimethylamine is complete. At 240° C. the reaction is very fast, being completed in only a few minutes.

EXAMPLES 4–8

When polylactones in which the $R^1$ nucleus is derived from each of the following diamines is treated according to the procedure of Example 2, the corresponding polyamide-amide is obtained:

m-phenylenediamine;
4,4′-diaminodiphenyl sulfone;
4,4′-diaminodiphenyl methane;
4,4′-diaminodiphenyl propane;
2,4-diamino-isopropylbenzene.

Heating at about 250° C. causes these polyamide-amide films to convert to polyimide films having excellent physical properties.

EXAMPLES 9–13

Likewise, when polylactones in which the R nucleus is derived from each of the following dianhydrides are treated by the procedure of Example 2, the corresponding polyamide-amides are obtained readily:

3,3′,4,4′-benzophenonetetracarboxylic dianhydride;
2,2-bis(3,4-dicarboxyphenyl)propane dianhydride;
bis(3,4-dicarboxyphenyl)sulfone dianhydride;
bis(3,4-dicarboxyphenyl)ether dianhydride;
3,3′,4,4′-diphenyltetracarboxylic dianhydride.

Heating at about 250° C. causes these polyamide-amide films to convert to polyimide films having excellent physical properties.

EXAMPLE 14

A solution of the polyamide-dimethylamide made by bubbling dimethylamine through a solution of the polyiminolactone of pyromellitic acid and 4,4′-diaminodiphenyl ether is coated onto a copper wire. Heating at 200–300° C. for several minutes produces a tough polyimide-coated wire.

EXAMPLE 15

Using the procedure of Example 1, the polylactone was caused to react with ethylene diamine. The product was colorless, and was identified as the desired polyamide-amide.

EXAMPLES 16–23

The procedure of Example 1 is repeated using, instead of N,N′-dicyclohexyl carbodiimide in N,N-dimethylformamide and N,N-dimethylacetamide, each of the following cyclizing agents at 1 molar concentration in a benzene solution also containing pyridine:

Examples:
16—propionyl fluoride,
17—valeryl chloride,
18—bromoacetyl bromide,
19—thionyl chloride,
20—acetyl chloride,
21—phenyl phosphonic dichloride,
22—chloroacetic anhydride,
23—trifluoroacetic anhydride.

EXAMPLE 24

A solution of 2.16 grams (0.01 mole) of pyromellitic diimide in 16 grams of dimethyl sulfoxide is prepared by refluxing the diimide in the solvent. To this solution is added 1.98 grams (0.01 mole) of 4,4′-diamino-diphenyl methane. The reaction mixture is refluxed with agitation until polymerization has progressed to the point where a film can be prepared by casting a portion of the solution onto a plate and evaporating the solvent. This clear yellow-brown film has an inherent viscosity of 0.06 (as a 0.5% solution in dimethyl sulfoxide). The polyamide-amide structure is confirmed by infrared spectra. This film is heated in a vacuum under a nitrogen atmosphere at 300° C. to convert it to the corresponding polyimide by elimination of ammonia.

What is claimed is:
1. A polymer consisting essentially of recurring units of

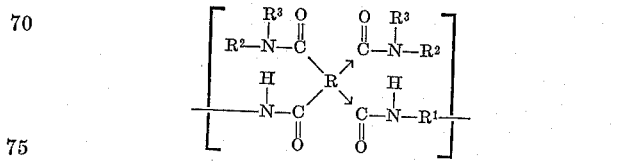

wherein the arrow denotes isomerism;
R is a radical selected from the group consisting of

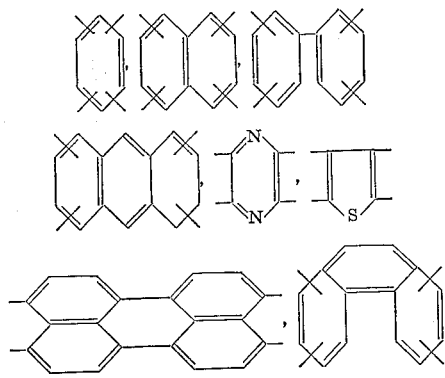

and

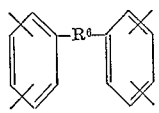

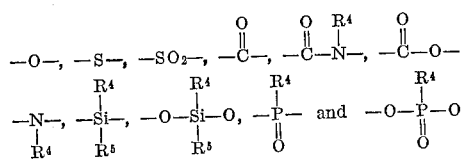

where $R^6$ is selected from the group consisting of an alkylene chains having 1-3 carbon atoms, $$-O-,\ -S-,\ -SO_2-,\ -\overset{O}{\underset{}{C}}-,\ -\overset{O}{\underset{}{C}}-\overset{R^4}{\underset{}{N}}-,\ -\overset{O}{\underset{}{C}}-O-$$

$$-\overset{R^4}{\underset{R^4}{N}}-,\ -\overset{R^4}{\underset{R^5}{Si}}-,\ -O-\overset{R^4}{\underset{R^5}{Si}}-O-,\ -\overset{R^4}{\underset{\overset{\|}{O}}{P}}-\ \text{and}\ -O-\overset{R^4}{\underset{\overset{\|}{O}}{P}}-O$$

where $R^4$ and $R^5$ are selected from the group consisting of alkyl and aryl;
$R^1$ is arylene;
and $R^2$ and $R^3$ are selected from the group consisting of the substituents on the amine nitrogen in ammonia, methyl amine, dimethyl amine, ethyl amine, diethyl amine, propyl amine, ethylenediamine, aniline, N-methylaniline, o-toluidine, m-toluidine, p-chloroaniline, 2,3-xylidine, 2,4-xylidine, 2,5-xylidine, 2,6-xylidine, 3,4-xylidine, and 3,5-xylidine.

2. The polymer of claim 1 wherein R is selected from the group consisting of the aromatic radicals in pyromellitic dianhydride, 3,3',4,4'-diphenyl tetracarboxylic dianhydride, 2,2-bis(3,4-dicarboxyphenyl) propane dianhydride, bis(3,4-dicarboxyphenyl) sulfone dianhydride, bis(3,4-dicarboxyphenyl) ether dianhydride and 3,4,3',4'-benzophenone tetracarboxylic dianhydride.

3. The polymer of claim 1 wherein $R^1$ is selected from the group consisting of metaphenylene, 4,4'-diphenyl propane, 4,4'-diphenyl methane, 4,4'-diphenyl ether, 4,4'-diphenyl sulfone and isopropyl-2,4-phenylene.

4. The polymer of claim 1 wherein $R^2$ and $R^3$ are hydrogen.

5. The polymer of claim 1 wherein $R^2$ and $R^3$ are methyl.

6. The polymer of claim 1 wherein $R^2$ is hydrogen and $R^3$ is phenyl.

7. The polymer of claim 1 wherein $R^2$ is hydrogen and $R^3$ is amino-ethyl.

8. A self-supporting shaped article of a polymer consisting essentially of recurring units of

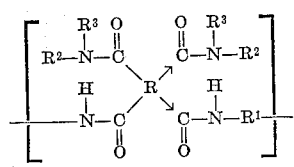

wherein the arrow denotes isomerism;
R is a radical selected from the group consisting of

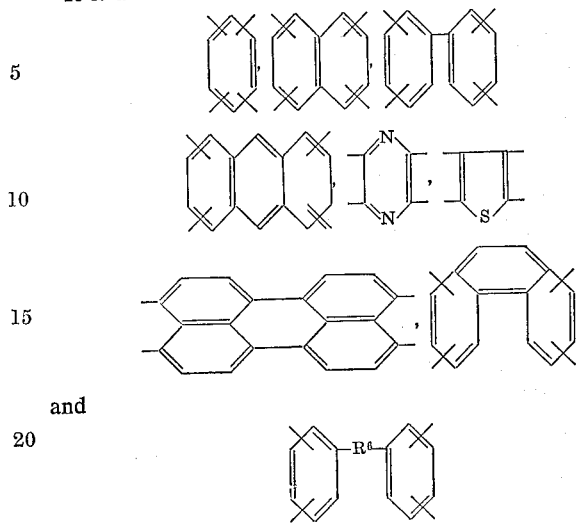

and

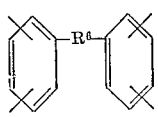

where $R^6$ is selected from the group consisting of an alkylene chain having 1-3 carbon atoms, $$-O-,\ -S-,\ -SO_2-,\ -\overset{O}{\underset{}{C}}-,\ -\overset{O}{\underset{}{C}}-\overset{R^4}{\underset{}{N}}-,\ -\overset{O}{\underset{}{C}}-O-$$

$$-\overset{R^4}{\underset{R^4}{N}}-,\ -\overset{R^4}{\underset{R^5}{Si}}-,\ -O-\overset{R^4}{\underset{R^5}{Si}}-O-,\ -\overset{R^4}{\underset{\overset{\|}{O}}{P}}-\ \text{and}\ -O-\overset{R^4}{\underset{\overset{\|}{O}}{P}}-O$$

where $R^4$ and $R^5$ are selected from the group consisting of alkyl and aryl;
$R^1$ is arylene;
and $R^2$ and $R^3$ are selected from the group consisting of the substituents on the amine nitrogen in ammonia, methyl amine, dimethyl amine, ethyl amine, diethyl amine, propyl amine, ethylenediamine, aniline, N-methylaniline, o-toluidine, m-toluidine, p-chloroaniline, 2,3-xylidine, 2,4-xylidine, 2,5-xylidine, 2,6-xylidine, 3,4-xylidine and 3,5-xylidine.

9. A self-supporting film of a polymer consisting essentially of recurring units of

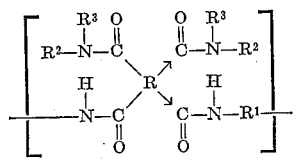

wherein the arrow denotes isomerism;
R is a radical selected from the group consisting of

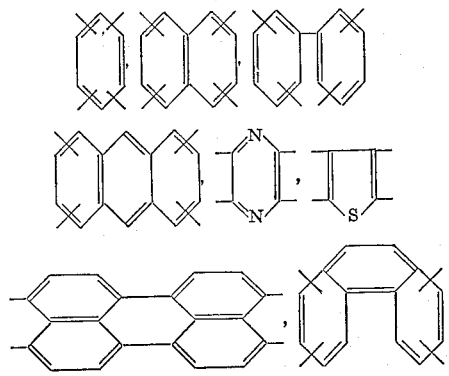

and

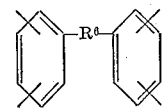

where R⁶ is selected from the group consisting of an alkylene chain having 1–3 carbon atoms,

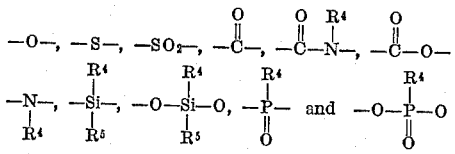

where R⁴ and R⁵ are selected from the group consisting of alkyl and aryl;
R¹ is arylene;
and R² and R³ are selected from the group consisting of the substituents on the amine nitrogen in ammonia, methyl amine, dimethyl amine, ethyl amine, diethyl amine, propyl amine, ethylenediamine, aniline, N-methylaniline, o-toluidine, m-toluidine, p-chloroaniline, 2,3-xylidine, 2,4-xylidine, 2,5-xylidine, 2,6-xylidine, 3,4-xylidine and 3,5-xylidine.

10. A process for preparing polymeric compositions which comprises treating a polyiminolactone consisting essentially of recurring units of the formula:

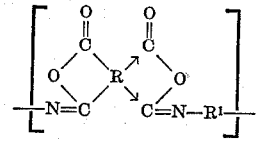

wherein the arrows denote isomerism;
R is a radical selected from the group consisting of

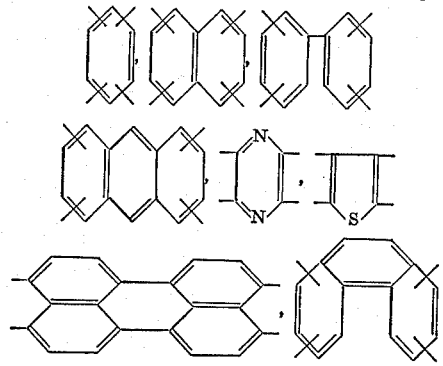

and

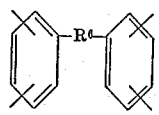

where R⁶ is selected from the group consisting of an alkylene chain having 1–3 carbon atoms,

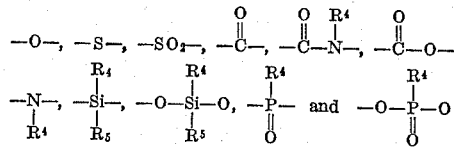

where R⁴ and R⁵ are selected from the group consisting of alkyl and aryl;
R¹ is arylene;
with a compound selected from the group consisting of ammonia, methyl amine, dimethyl amine, ethyl amine, diethylamine, propyl amine, ethylenediamine, aniline, N-methylaniline, o-toluidine, m-toluidine, p-chloroaniline, 2,3-xylidine, 2,4-xylidine, 2,5-xylidine, 2,6-xylidine, 3,4-xylidine and 3,5-xylidine, to form a polyamide-amide having recurring units of the formula

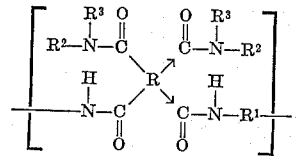

wherein the arrows denote isomerism;
R is a radical selected from the group consisting of

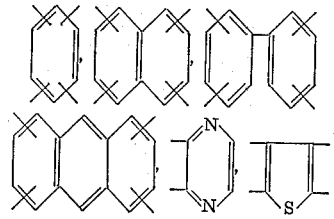

and

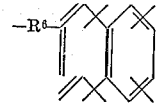

where R⁶ is selected from the group consisting of an alkylene chain having 1–3 carbon atoms,

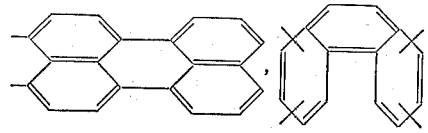

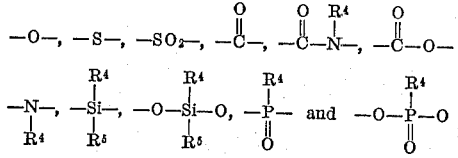

where R⁴ and R⁵ are selected from the group consisting of alkyl and aryl;
R¹ is arylene;
and R² and R³ are selected from the group consisting of the substituents on the amine nitrogen in ammonia, methyl amine, dimethyl amine, ethyl amine, diethyl amine, propyl amine, ethylenediamine, aniline, N-methylaniline, o-toluidine, m-toluidine, p-chloroaniline, 2,3-xylidine, 2,4-xylidine, 2,5-xylidine, 2,6-xylidine, 3,4-xylidine and 3,5-xylidine.

11. A polymer according to claim 1 having an inherent viscosity at 30° C. of 0.3 to 5.0 as measured as a 0.5% solution in concentrated sulfuric acid.

References Cited by the Examiner

UNITED STATES PATENTS

| | | | |
|---|---|---|---|
| 3,179,630 | 4/1965 | Endrey | 260—78 |
| 3,179,632 | 4/1965 | Hendrix | 260—78 |
| 3,179,633 | 4/1965 | Endrey | 260—78 |

WILLIAM H. SHORT, *Primary Examiner.*

H. D. ANDERSON, *Assistant Examiner.*